United States Patent [19]

Snitzer et al.

[11] 4,302,970
[45] Dec. 1, 1981

[54] OPTICAL TEMPERATURE PROBE EMPLOYING RARE EARTH ABSORPTION

[75] Inventors: Elias Snitzer, West Hartford; William H. Glenn, Vernon, both of Conn.

[73] Assignee: United Technologies Corporation, Hartford, Conn.

[21] Appl. No.: 148,343

[22] Filed: May 9, 1980

[51] Int. Cl.³ .............................................. G01K 1/00
[52] U.S. Cl. ................................................. 73/339 R
[58] Field of Search ......... 73/339 R, 355 R, 355 EM, 73/356; 356/44, 43

[56] References Cited

U.S. PATENT DOCUMENTS

| | | | |
|---|---|---|---|
| 3,672,221 | 6/1972 | Well | 73/339 R |
| 4,151,747 | 5/1979 | Gottlieb et al. | 73/339 R |
| 4,179,927 | 12/1979 | Saaski | 73/339 R |
| 4,203,326 | 5/1980 | Gottlieb et al. | 73/339 R |

Primary Examiner—Donald O. Woodiel
Attorney, Agent, or Firm—Richard P. Lange

[57] ABSTRACT

A temperature probe formed by an optical fiber having a core fabricated from a glass host doped with a trivalent rare earth is positioned at the location temperature is to be measured. One of the rare earth elements, europium, has low lying energy levels that have significant population changes over certain desirable temperature ranges, i.e., related to the population of this particular energy level transition is monitored to determine the temperature at the location of the temperature probe. A simplified embodiment of a temperature measuring device incorporating the optical temperature probe includes at least one LED, or equivalent, to generate light into the input end of the optical fiber. The preselected wavelength of light that corresponds to the absorption line of interest experiences a change in strength as function of temperature. A detector at the output end measures changes in strength of the absorbed light by normalizing to an unabsorbed wavelength of light.

7 Claims, 6 Drawing Figures

OPTICAL TEMPERATURE PROBE EMPLOYING RARE EARTH ABSORPTION

DESCRIPTION

1. Technical Field

This device relates generally to a temperature responsive optical device, and more specifically to a temperature probe having an optical waveguide incorporating certain rare earth ions that exhibits an absorption characteristic which varies as a function of temperature.

2. Background Art

Temperature sensors are generally known and have been used for many years to sense temperature variations in a wide assortment of environments. Temperature sensors have been employed in hostile environments that may be subject to extremely high temperatures causing a reliability problem with the sensor itself. In that a conventional temperature sensor is typically electrically interrogated to obtain an indication of the temperature at the location of interest. Inherent in this conventional interrogation process is the presentation of an electrical signal through leads to the thermal transducer which can impose undesirable constraints on the system. Such systems can be susceptible to electromagnetic interference which tends to further lower the system reliability.

It is also generally known that the optical characteristics of certain glasses or materials configured in the form of optical fibers vary as a function of temperature. For example, in a treatise entitled "Optical Wave Guide" by N. S. Kapany and J. J. Burke published in 1972, it was recognized that two closely spaced glass fiber cores positioned in a cladding would experience a beat phenomena as a function of temperature. Beginning on page 255, there is described an experiment in which light energy propagating through an optical waveguide experiences a beat phenomena that varies in response to changes in ambient temperature.

A temperature sensor employing an optical waveguide is described in U.S. Pat. No. 4,151,747 issued May 1, 1979 to M. Gottlieb et al for "Taps Monitoring Arrangement Utilizing Fiber Optics". A temperature sensor consists of an optical waveguide having an inner core and a cladding enclosing the core. A light source is positioned at one end of the waveguide and a detector is located at the other end. Temperature change causes variations in the light received at the detector. Another embodiment includes two optical fibers positioned adjacent each other in a common cladding. Input light is conducted along the length of one fiber and passes out of the core sidewall of one fiber in an amount which varies with the temperature of the fiber. The second fiber is in a sufficiently close proximity to the first fiber to capture at least some of the light leaving the first fiber. By monitoring the light received in the second fiber, a determination can be made as to the variation in temperature along the length of the fiber.

Of particular interest is a paper entitled "Non-Interferometric Measurement of Temperature With Optical Fibers", by M. Gottlieb and G. G. Brandt presented to the 12th Annular Electro-Optics Converence and Exposition at Anaheim, California on Oct. 23-25, 1979. The presentation described several techniques for sensing temperature using non-interferometric means in which the fiber propagation characteristics are modified by temperature changes in the fiber. One device included an optical fiber with a core small enough to support only the lowest order mode, the core being clear glass with no absorption. The cladding was formed from an absorbing glass with a lower index of refraction. With a change in temperature, the extent of penetration of light into the cladding changes the transmissiveness of the optical fiber. In other words, the extent to which the light sees the absorption in the cladding changes the transmission of light through the fiber. Another embodiment utilizing the absorbing cladding principle is a double cladded optical fiber, the innermost cladding being thin and clear while the outer one is absorbing. Both of these embodiments describe an optical fiber which demonstrates a temperature sensitive absorption in which the absorption is in the cladding. This technique depends on the change in light penetration into either the first or second absorbing cladding in conjunction with a difference in the temperature coefficients for the indices of refraction for the core and cladding.

Also of interest is an article entitled "An Optical Temperature Sensor For High Voltage Application" by E. W. Saaski and R. L. Skaugset presented to the 7th IEEE/PES Transmission And Distribution Conference and Exposition, Apr. 1-6, 1979. The glasses described in this article display a temperature dependent transmission in a phase separated ruby glass. This nonhomogeneous semi-crystalline state is usually formed during a post-production heat treatment at temperatures in excess of 500° C. Typical colorants include sulfur, cadmium sulphide, cadmium selenide, gold and selenium. A particular disadvantage of this temperature dependent absorption technique is that a glass composition of this type is in a nonhomogeneous semi-crystalline state, and, as such, this glass is not suited to reproducibly forming a small diameter core required by some glass fibers. The result is that fibers carry light to and away from the ruby glass, but the temperature dependent absorption is in a macroscopic non-fiber configuration.

DISCLOSURE OF INVENTION

It is an object of the present invention to provide an optical temperature sensor in which the active optical element is a host doped with rare earth ions so that the active element has an absorption characteristic that varies as a function of temperature.

According to the present invention, an optical temperature probe includes rare earth ions incorporated into a high optical quality host such as a crystal glass, plastic, liquid, etc. The host may, if desired, be formed into a small optical fiber so that it can be easily and conveniently positioned at the location where the temperature is to be measured. Light energy from a remote source is then presented to the optical probe via a conventional optical fiber, or the like. The temperature probe with the rare earth ions forms a material having an absorption spectrum which varies according to the temperature of the probe. The light energy emerging from the optical temperature probe is presented to a detector which measures the changing absorption within the temperature probe. In that the relative population of the energy levels within the optical temperature probe vary as a known function of temperature, a unique absorption characteristic exists for each temperature and this temperature can be measured by ascertaining the relative strength of the absorption lines.

A particular feature of the present invention involves the use of an optical fiber having a core doped with trivalent rare earth ions which functions as a temperature probe. Light energy presented to such a temperature probe experiences absorption lines that appear as a result of populating higher excited states at higher temperatures. Accordingly, by measuring the relative intensity of light passed by the temperature probe, the change in absorption can be directly related to a change in temperature.

According to the present invention, one embodiment includes a light source positioned at one location to emit a beam of light energy which is presented to an optical temperature probe at the location where the temperature is to be measured. After passing through the optical probe, the light beam is directed via an optical cable to a detector. The detector measures intensity of a particular wavelength of light to determine the relative absorption of light energy in the optical probe. The output from the detector is a signal that can be linearized by comparison to calibration data to provide a signal proportional to the temperature sensed by the probe.

According to an aspect of the present invention, a temperature probe formed from trivalent rare earth ions disposed in a host exhibits a change in population of its energy levels which is a function of temperature over a temperature range of interest. The host material, such as glass, can then be formed into a desired form, such as an optical fiber, through which light can propagate. The intensity of particular wavelengths of transmitted light absorbed by the temperature probe are sensed at the output end of the fiber. An electrical signal dependent on the absorption characteristic is then linearized in a conventional processor by comparison with prerecorded calibration data in a look-up table. The final output signal is a reading of temperature at the location of the probe.

The foregoing and other objects, features and advantages of the present invention will become more apparent from the following description of preferred embodiments and accompanying drawings.

BEST MODE FOR CARRYING OUT THE INVENTION

Figure 1:
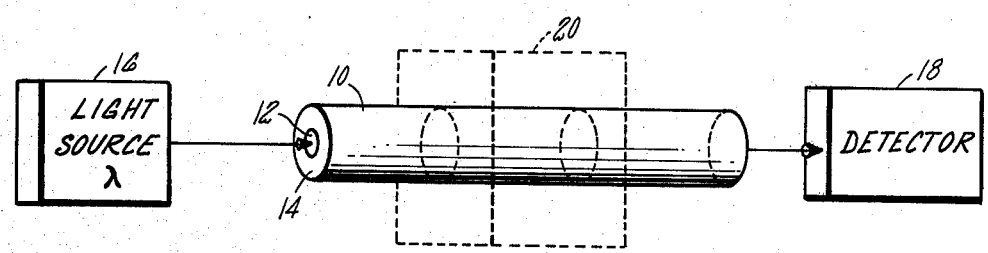
FIG. 1 is is a schematic illustration of a temperature monitoring arrangement employing the optical temperature probe according to the present invention.

Turning first to FIG. 1, a simplified embodiment of a temperature monitoring device employing an optical temperature probe according to the present invention is shown. The optical probe in preferred form is shaped as an optical fiber that includes an inner core 12, and a cladding 14 that surrounds the core 12 along the entire length of the fiber. In accordance with the present invention, the core is fabricated from a glass material which has been doped with a predetermined amount of a preselected rare earth element, such as europium, causing the optical fiber to exhibit an absorption characteristic that varies as a function of temperature. Differently stated, the intensity of specific wavelengths of light that is transmitted by such an optical waveguide is related to the absorption characteristic of the waveguide, and can be identified by monitoring the transmissiveness of light propagating through the fiber.

A simple temperature measuring system would include a light source 16 and a detector 18, both of which would be of a conventional design. The optical temperature probe then extends from the location of the light source 16 through an area 20, the temperature of which is to be measured, to the location of the detector 18 where the emerging light is presented to the detector. The light source 16 may be a conventional type, for example, a light emitting diode which emits a spectrum of wavelengths, or possibly a relatively narrow band of wavelengths. Alternatively, an optical filter could be used to limit the spectrum of light which is presented to the optical fiber to a single wavelength, or to a narrow band of wavelengths. The detector 18 may also be of the conventional type, for example, a PIN diode which is selected to be responsive to the frequency of light emitted by the light source 16. An optical filter could also be employed to limit the bandwidth of the light emerging from the fiber so that the diode is responsive to a relatively narrow band of wavelengths. As briefly mentioned herebefore, temperature changes along the length of the fiber in area 20 causes an identifiable change in the transmissiveness of the fiber to particular wavelengths of light, and these wavelengths can be identified at the output end of the fiber by monitoring an electrical signal from the detector 18. It is this phenomena that allows the optical fiber 10 to function as a temperature probe in measuring the temperature in the area 20.

Figure 2:
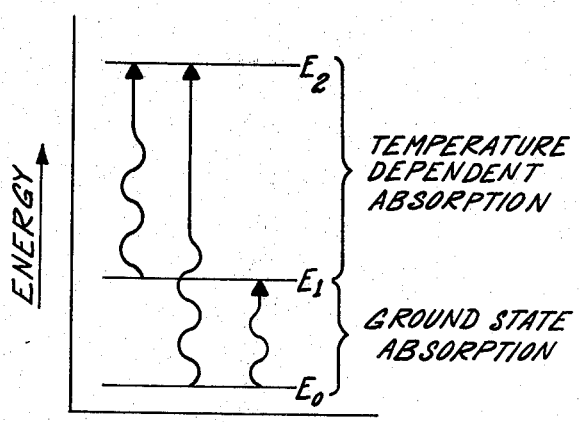
FIG. 2 is a simplified schematic illustration of the energy levels of certain elements.

As briefly mentioned herebefore, a particular feature of the present invention is that the temperature probe is the optical fiber 10 which has been fabricated to be temperature responsive. The optical fiber 10 includes the high optical quality core 12 in which trivalent rare earth elements are doped in a glass host, or equivalent crystalline structure. In the selection of a rare earth element for the core 12, it is desirable to select an element which has absorption transitions originating in energy levels that have significant population at the temperature of interest. A more complete understanding of how to determine how temperature affects the rare earth doped core 12 of the optical fiber 10 is possible by referring to FIG. 2 and the discussion hereinafter. In a simplified three-level system, as is shown in FIG. 2, at low temperatures the core material has only population in the ground state $E_0$, and there is no significant population in the first energy level $E_1$, of in higher energy levels. As the temperature of the material increases, population of level $E_1$ will occur and an absorption line corresponding to the transition between energy level $E_1$ and energy level $E_2$ will appear.

As briefly mentioned herebefore, europium is a rare earth element that is particularly well suited for use in the temperature probe according to the present invention. One important reason is that the absorption transitions of europium originate in energy levels that have significant population at relatively low temperatures, i.e., around 0° C. In addition, europium ions $Eu^{3+}$ may be readily incorporated into a glass host. The glass itself doped with the $Eu^{3+}$ ions can be drawn by numerous well-known techniques to a small diameter to form the core of an optical fiber.

Temperature probes in which the temperature responsive device is an optical fiber are also desirable. This is because an optical fiber is extremely small and thus the few meters of such an optical fiber that is typically required to function as a temperature probe will occupy a small volume. Such optical fibers can also be designed as a multimode step index fiber, a multi-mode graded index fiber, or a single-mode fiber depending on the design and needs of the other components in the system.

Figure 3:
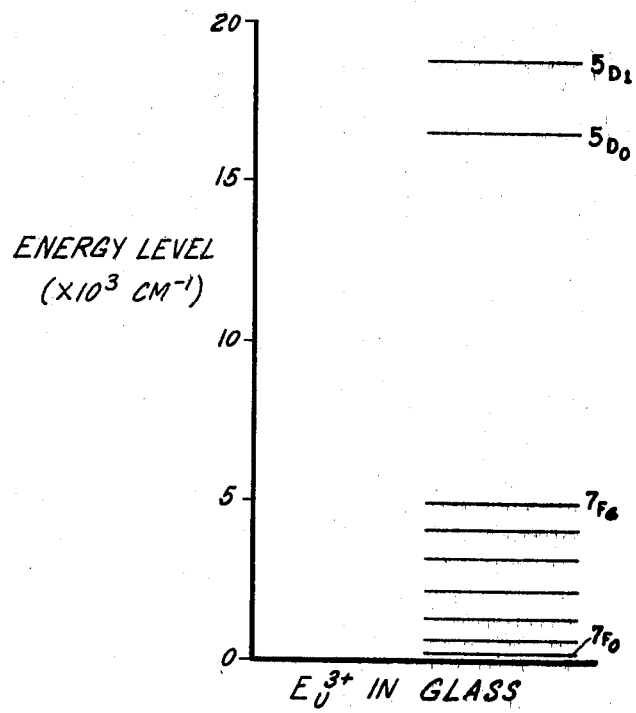
FIG. 3 is a schematic illustration of a portion of the energy levels related to trivalent europium ions.
Figure 4:
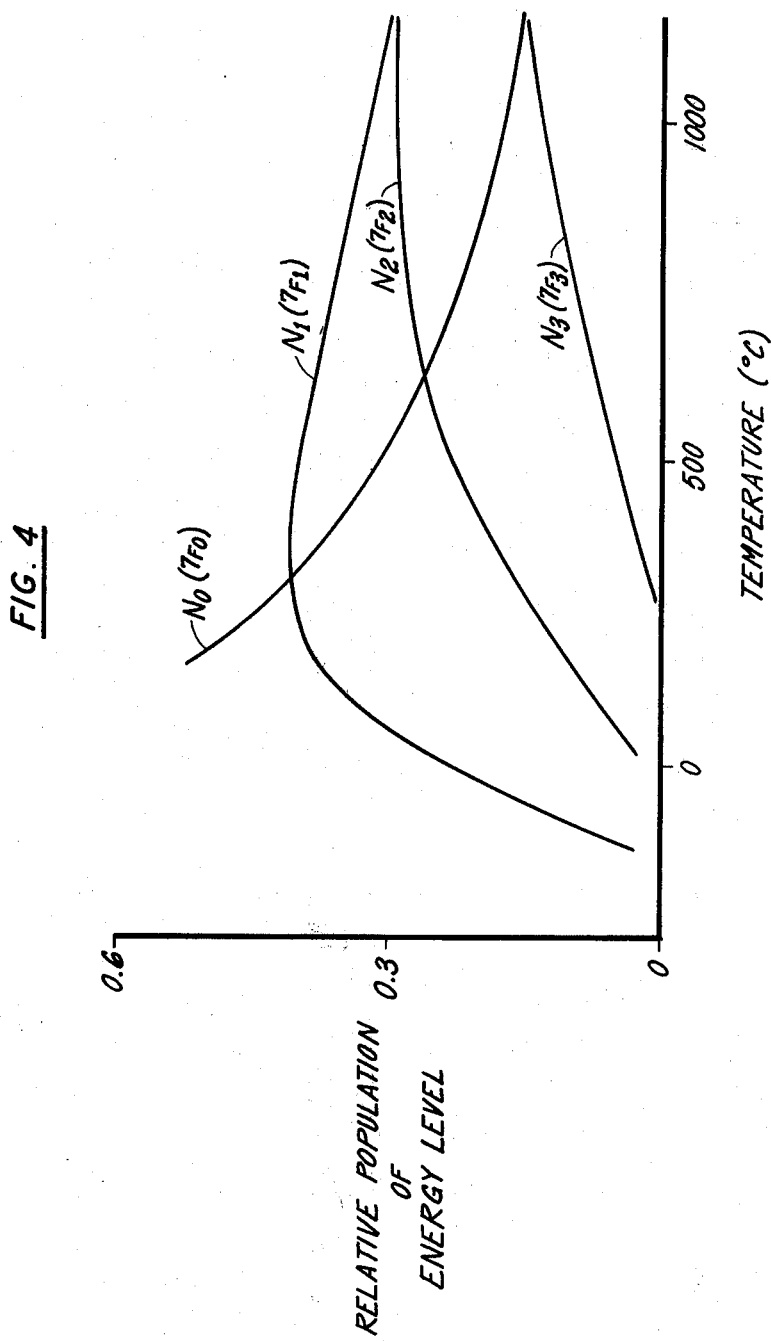
FIG. 4 is a graph depicting the population of several energy states for europium ions over a particular temperature range.

Referring now to FIG. 3, there is a schematic illustration depicting the lowest energy levels of europium. Initially, it will be noted that there will be two major sets of absorption peaks. One major set of absorption peak results from transitions originating in the lower lying state and terminating in the $^5D_0$ state, and the other originating in the low lying state and terminating in the $^5D_1$ state. The population of these energy levels can be calculated as a function of temperature by well-known thermodynamic methods. Referring to FIG. 4 in addition to FIG. 3, there is seen a drawing depicting the population levels of several of the low lying energy levels of europium ions $Eu^{3+}$ as a function of temperature. The fractional population $N_0$, $N_1$, $N_2$ and $N_3$ of the four lowest states are shown over a temperature range of 0° C. to approximately 1000° C. As would be expected, the population of the ground state $N_0$ decreases monotonically with increasing temperature due to the population at the higher energy levels. Thus, the absorption line originating in ground state $N_0$ becomes weaker at higher temperatures. Next, consider the first energy level $N_1$. It will also be observed that the population of the first level $N_1$ increases dramatically at the low end of the temperature range to a maximum and then decreases over the remaining portion of the temperature range. If a temperature range of more than about 0° C. to 200° C. is required, the absorption line originating in this first energy level $N_1$ is not suitable. Now considering the population of the second energy level $N_2$, it will be noted that it increases monotonically, and almost linearly, over the temperature range of 0° C. to 1000° C. Accordingly, an absorption line originating in this energy level would demonstrate a continual increase in strength as the temperature changes through this particular range. Finally, there is no significant population of third energy level $N_3$ until about 500° C. Accordingly, the monitoring of the absorption line originating in the $N_3$ energy level is less suitable than the absorption line from the $N_2$ energy level for the 0° C. to 1000° C. temperature range. As should be apparent, the temperature range of interest is initially identified, and then a curve that demonstrates a significant change over that temperature range is selected as the population change to follow.

Figure 5:
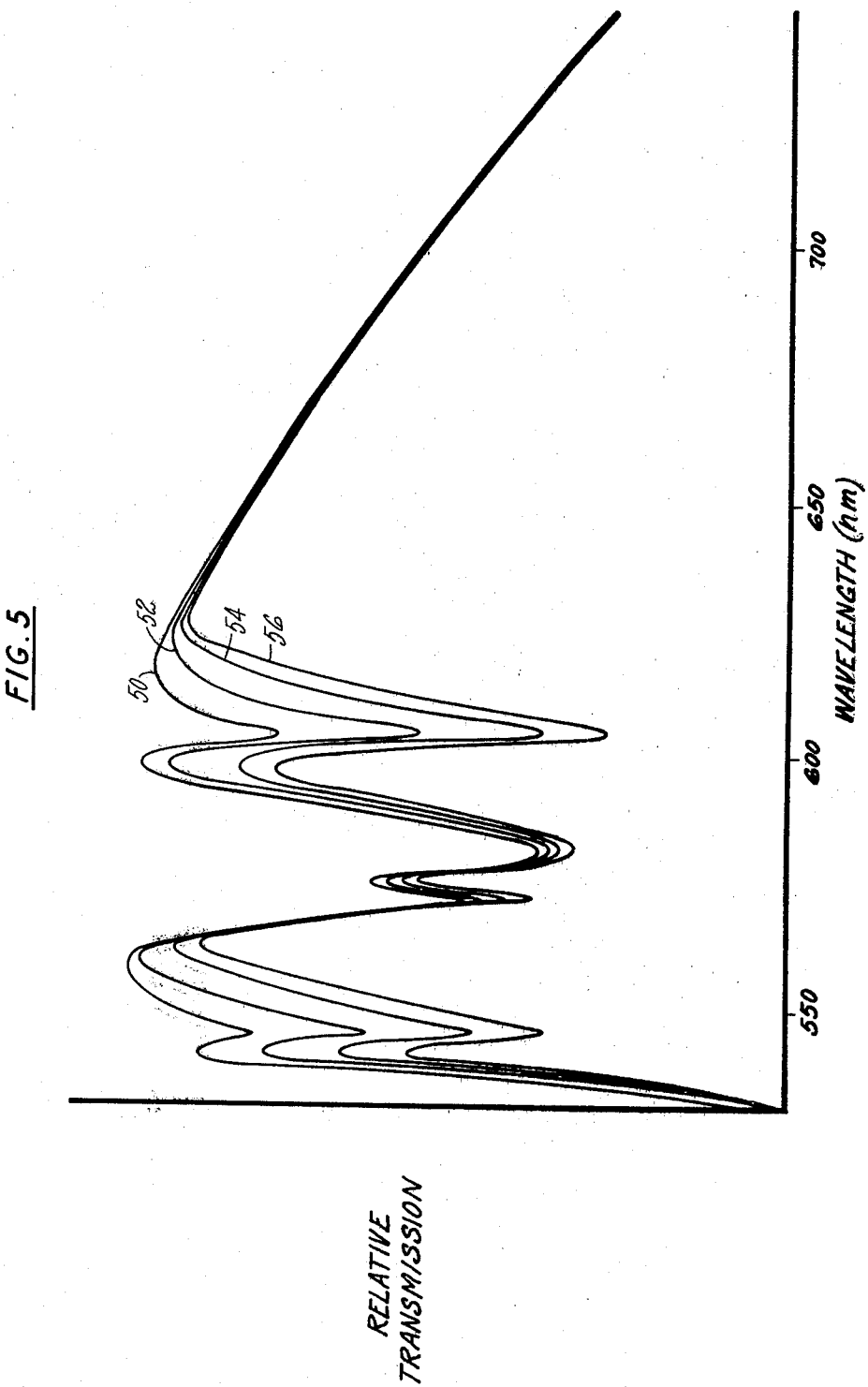
FIG. 5 is a graph depicting the transmissiveness of a europium doped optical fiber at several different temperatures.

As mentioned herebefore, the optical temperature probe of the present invention utilizes the absorption peaks, or dips in transmission, of light propagating through an optical fiber having a predetermined amount of trivalent rare earth ions, such as europium, Eu, to measure the temperature of the location of the probe. The light emerging from the doped temperature probe has a particular frequency content, the characteristic of which allows the temperature at the location of the probe to be monitored. An appreciation of this phenomena might be more apparent by reference to FIG. 5 which depicts the transmission of an europium doped optical fiber at different temperatures as a function of wavelength. For example, the relative transmissiveness of a fiber doped with europium at a temperature of 25° C. is illustrated by line 50. In a similar manner, the transmissivenss for the same fiber at a temperature of approximately 140° C. is depited by the line 52, at 250° C. by the line 54, and at 370° C. by the line 56. It will be noted that several absorption peaks are shown but the one of particular interest occurs at a wavelength of just over 600 nanometers. The absorption peaks associated with this wavelength is the absorption resulting from the $^7F_2$-$^5D_0$ transition ($N_2$ of FIG. 4). These peaks show a sufficiently strong change in strength to provide an acceptable level of temperature sensitivity over this temperature range. Accordingly, the light source 16 and the detector 18 of the embodiment generally depicted in FIG. 1 would be tuned to transmit and respond to light of this particular frequency, i.e., about 600 nanometers, to measure the change in these absorption peaks.

The present invention involves the use of a host material doped with trivalent rare earth ions, one of the prime dopant being europium. However, it should be understood that numerous other rare earth elements which can be readily selected from any chart depicting energy levels for trivalent rare earth elements. Other rare earth elements which could be well suited for use in the temperature range comparable to europium are neodymium and samarium. In addition, other possible rare earth elements would be praseodymium, cerium and terbium. However, other rare earth elements could possibly be used but are not as desirable as the aforementioned because they are either radioactive, extremely rare, have inappropriate low lying energy levels, or a combination of the above deficiencies.

A glass is a preferred host for the temperature probe according to the present invention because the doped glass can be easily drawn into a glass fiber. Accordingly, the maximum operating temperature of such a rare earth optical temperature probe is most often defined by the softening point of the glass host. Many glasses have a softening point of about 500° C. and thus would not be suitable in an optical fiber for measuring temperatures above this value. To operate at these higher temperatures, it is necessary to use a host from the more refractory glasses. For the higher temperature operation, aluminosilica, such as Corning Glass No. 1720 and Corning Cortran Glass Code No. 9753, have relatively high strain and softening points and should demonstrate a good solubility for rare earth ions. It should be understood that numerous other glasses from the family of rare earth-aluminosilicate glasses could also be used in the present invention. Fuse silica also has the necessary high strain and softening points but generally demonstrates a much more limited range of solubility for rare earth oxide making it difficult to achieve the necessary ion density.

Figure 6:
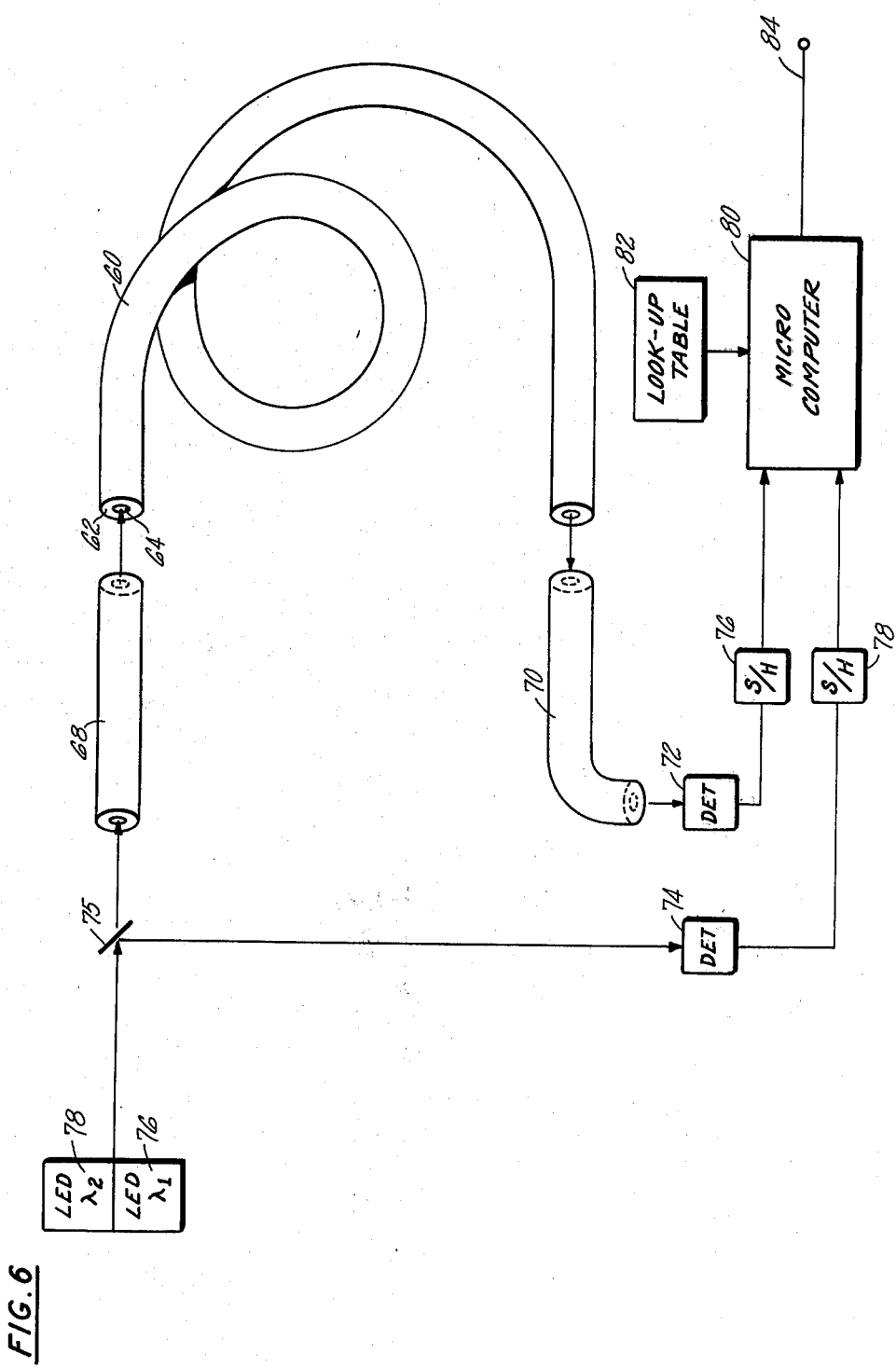
FIG. 6 is an illustration of one embodiment of a temperature monitoring device employing the optical temperature probe according to the present invention.

Referring finally to FIG. 6, there is seen an embodiment, in block diagram form, of a temperature measuring system employing the optical temperature probe according to the present invention. The optical temperature probe, preferably formed as a rare earth doped optical fiber 60, is positioned at the location where the temperature is to be measured. The optical fiber 60 has a core 62 formed from a high optical quality glass which functions as a host for the selected rare earth element, such as europium. As described in greater detail herebefore, this europium doping causes the optical fiber 60 to demonstrate an absorption characteristic which varies as a function of temperature. A cladding 64, as is well known, is provided around the core 62 and is formed from a material which has an index of refraction less than that of the core material thereby forming an optical waveguide. Two light sources such as an LED 76 and LED 78, provide beams of light which are presented by an optical fiber 68, preferably of conventional design, to the end of the europium doped optical fiber 60. The LED 76 provides light which include the wavelength $\lambda_1$ related to the absorption characteristic of the rare earth doped core 62, and the LED 78 provides light of a wavelength $\lambda_2$ that will be relatively unaffected by temperature dependent absorption changes within the optical fiber 60. This latter wavelength of light $\lambda_2$ serves as a reference against which the absorption peaks can be measured. Light emerging from the temperature probe is coupled by an optical fiber 70, also of conventional design, to a detector 72 which senses the intensity of light incident thereon. The LED 76 and the LED 78 are sequentially pulsed so that a single detector can be used to measure the intensity of the incident light. However, if desired, separate detectors and filters could be used and the LED's 76 and 78 could operate simultaneously.

As is known, sources of light energy, such as the LED's 76 and 78, do not normally provide a light output that is constant, but rather the precise magnitudes of any particular wavelength may vary with time due to such things as, aging of the unit, ambient temperature, etc. Accordingly, in preferred form it is desirable to measure at least the energy content of those particular wavelengths of interest so that an output signal can be appropriately normalized for inherent variation related to the light source itself. Although numerous normalizing techniques are well known to those of ordinary skill, one technique involves the use of a partially reflective mirror 75 positioned between both the LED 76 and the LED 78 and the optical fiber 68 to redirect a portion of the light emitted by the light sources. This light is presented to a detector 74, similar to detector 72, which measures the intensity of the particular wavelengths of interest. As just mentioned, the output of the detector 76, in sequence, is indicative of the intensity of at least two wavelengths of light, one of which is a function of the temperature dependent absorption characteristic of the optical fiber 60 and one of which is not. In addition, the corresponding output signals from the detector 88 are signals whose magnitudes are indicative of the respective intensities of light presented to the temperature dependent optical fiber 60. With this information numerous different embodiments of a signal processing circuit for linearizing these signals are known to those of ordinary skill. However, one relatively simple embodiment includes a sample and hold circuit 76, timed to the sequential pulsing of the LED's 76 and 78, to store the output level from the detector 72. A sample and hold circuit 78 is connected to the output of detector 74 to store the output values corresponding to the intensity of the input light. One of the many known processing circuits, such as a microcomputer 80, uses the relative values of the signal levels stored in the sample and hold units 76 and 78 to perform a simple mathematical calculation incorporating stored calibration data, such as from a look-up table 82, and provides an output signal on a line 84 indicating the temperature at the location of the probe.

Although this invention has been shown and described with respect to a preferred embodiment, it will be understood by those skilled in this art that various changes in form and detail thereof may be made without departing from the spirit and scope of the claimed invention.

We claim:

1. A temperature measuring device, comprising:
   a source means for providing a beam of light energy;
   optical means positionable at a location where temperature is to be measured, forming an optical waveguide through which said beam of light can propagate, said optical means having an absorption characteristic that varies as a function of temperature resulting from a host doped with a trivalent rare earth element;
   detector means responsive to light energy emerging from said optical means for indicating the amount of light energy absorbed within said optical means; and
   whereby said temperature measuring device provides an output signal that is uniquely related to the temperature at the location of said optical waveguide.

2. A temperature measuring device according to claim 1, wherein said trivalent rare earth element is europium.

3. A temperature measuring device according to claim 1, wherein said trivalent rare earth element is samarium.

4. A temperature measuring device according to claim 1, wherein said trivalent rare earth element is neodymium.

5. A temperature measuring device according to claim 1, wherein said source means generates a certain wavelength of light, and wherein said absorption characteristic of said optical means has an absorption line occuring at the same wavelength as the light from said source means.

6. A temperature measuring device according to claim 1, further including means connected to said detector means for comparing a signal therefrom with prerecorded date to derive a calibrated temperature value therefrom.

7. A temperature measuring device according to claim 1, wherein said source means includes at least first and second wavelength of light, one of which is related to the absorption characteristic of said optic means and one of which is not, and wherein the intensity of said absorption characteristic is measured by the difference between the amplitudes of said first and second wavelength of light.

* * * * *